United States Patent [19]
Helgesen et al.

[11] Patent Number: 5,234,378
[45] Date of Patent: Aug. 10, 1993

[54] BALANCED ROTARY ASSEMBLY

[75] Inventors: Gary D. Helgesen, Romulus; John H. Bale, Troy, both of Mich.

[73] Assignee: Ford Motor Company, Dearborn, Mich.

[21] Appl. No.: 563,651

[22] Filed: Aug. 6, 1990

[51] Int. Cl.$^5$ ............................. F16C 3/02; F16F 15/32
[52] U.S. Cl. ..................................................... 464/180
[58] Field of Search ............... 464/180, 182, 181, 179, 464/183

[56] References Cited

U.S. PATENT DOCUMENTS

| | | | |
|---|---|---|---|
| 1,645,323 | 10/1927 | Griswold | 464/180 X |
| 1,645,343 | 10/1927 | Moorhouse | 464/180 X |
| 3,940,948 | 3/1976 | Schultenkamper | 464/180 X |
| 4,170,896 | 10/1979 | Korkosz | 73/66 |
| 4,614,506 | 9/1986 | Sakata | 464/180 X |
| 4,663,819 | 5/1987 | Traylor | 464/181 X |
| 4,792,320 | 12/1988 | Nickel | 464/181 |
| 4,887,989 | 12/1989 | Kerecman | 464/180 |
| 4,895,551 | 1/1990 | Fritz | 464/180 |
| 4,952,195 | 8/1990 | Traylor | 464/183 X |

FOREIGN PATENT DOCUMENTS

| | | | |
|---|---|---|---|
| 45912 | 12/1959 | Austria | 464/180 |
| 2041159 | 9/1980 | United Kingdom | 464/180 |
| 2119063 | 11/1983 | United Kingdom | 464/180 |

*Primary Examiner*—Daniel P. Stodola
*Attorney, Agent, or Firm*—Joseph W. Malleck; Roger L. May

[57] ABSTRACT

A balanced rotary assembly having an axis of rotation, comprising: (a) an aluminum-based driveshaft; (b) at least one cast aluminum-based connector having its weight substantially equally divided on opposite sides of the axis and coaxially secured to the driveshaft; (c) a uniformly thick iron-based band embedded in the outer surface of the connector locked against relative rotation with the connector; and (d) one or more iron-based members welded to the band to bring the assembly into a desired rotationally balanced conditions.

9 Claims, 3 Drawing Sheets

BALANCED ROTARY ASSEMBLY

BACKGROUND OF THE INVENTION

1. Technical Field

This invention relates to the art of shaft balancing, and more particularly to the art of balancing tubular driveshafts for automotive use.

2. Discussion of the Prior Art

Balancing of automotive drivelines is a critical requirement. An automotive driveline is conventionally constructed of a roll-formed and longitudinally welded steel tube, to each end of which is welded a steel yoke (connector) for suitable reception of a universal joint. The steel tube, although manufactured to tight tolerances and specifications, will (i) not be uniformly cylindrical in cross-section and absolutely straight throughout its length, and (ii) have irregularities in wall thickness. Similarly, discontinuities appear in the cast or forged yoke connected to such tube. These material and geometrical irregularities will provide an incongruent mass and incongruent rotation centers causing eccentric loading imbalance; bearing loads, vibration, and vehicle noise will be aggravated by consequent whipping of the driveline resulting from unbalanced weight distribution.

Constructing such drivelines of steel has facilitated balancing. With steel driveshafts and yoke connectors, the standard practice has been to weld small weights to the steel tube, preferably to the ends of the steel tube adjacent or overlapping the connectors. The prior art has attempted to ease balancing steel drivelines by using adhesively applied metal tape, thus distributing the balancing weight over a greater area (see U.S. Pat. No. 4,170,896), and alternatively by use of riveted pads, which rivets pierce the wall thickness of the drive tube (see U.S. Pat. No. 4,887,989). The former is disadvantageous because of the high risk of contaminating the adhesive bond and consequently the strength of attachment; the latter is disadvantageous because of the piercing of the tubular driveline wall which creates an unsealed tube violating automotive requirements. Thus, welding balancing weights has remained the preeminent technique.

Construction of a driveline of aluminum or aluminum-based material makes such preeminent balancing technique unusable. Dense balancing weights, usually of steel or iron, cannot be welded to aluminum; soldering or brazing of such dissimilar materials is not sufficient to provide a secure attachment on an automotive driveline. Less dense weights, such as aluminum, will weld, but must be provided in such large size and mass that proper distribution of the balancing weight is difficult. In spite of the long recognized need for lighter weight material in automotive components, such as by the use of aluminum, the prior art has been unable to create a weldable, economical surface for dissimilar metals on an aluminum driveline assembly. Due to the inability to weld steel to aluminum, attaching a dissimilar balancing weight remains an unsolved problem.

Applicants' early experimental approaches proved inadequate, such as by attaching an iron-based ring to an aluminum driveshaft (tube) by shrink-fitting; not only was the fit not durable and stabilized over the expected life of the driveline, but the cost of shrink-fitting was exorbitant. Applicants have also attempted to use pop riveting of steel weights to an aluminum driveline, but the riveting created an unsealed interior due to rivet penetration and thus permits deterioration more rapidly.

SUMMARY OF THE INVENTION

This invention provides a solution to the above problem by use of a nonpenetrating cast embedment having interlocking edges that achieves a stabilized rotary union with the driveline connector; such embedment is a thin band presenting a weldable surface to which steel or iron-based weights can be welded.

More particularly, the invention is, in a first aspect, a balanced rotary assembly having an axis of rotation, comprising: (a) an aluminum-based driveshaft; (b) at least one cast aluminum-based connector having its weight substantially equally divided on opposite sides of the axis and coaxially secured to the driveshaft; (c) a uniformly thick iron-based band embedded in an outer surface of the connector surrounding said driveshaft and having means for locking the band against relative rotation with the connector; and (d) one or more iron-based members welded to the band to bring the assembly into a desired rotationally balanced condition if necessary.

Another aspect of the invention comprises a method of rotationally balancing an assembly about an axis of rotation, comprising: (a) casting an aluminum-based connector with an iron-based band implanted therein to expose a peripheral surface thereof; (b) attaching one or more of the connectors each coaxially to an end of an aluminum-based tubular driveshaft; and (c) welding iron-based masses to the exposed surface of the band required to bring the connector and driveshaft to a rotationally balanced condition.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 1a is an enlarged sectional view of the circled portion of FIG. 1 labled 1a;

DETAILED DESCRIPTION AND BEST MODE

Figure 1:
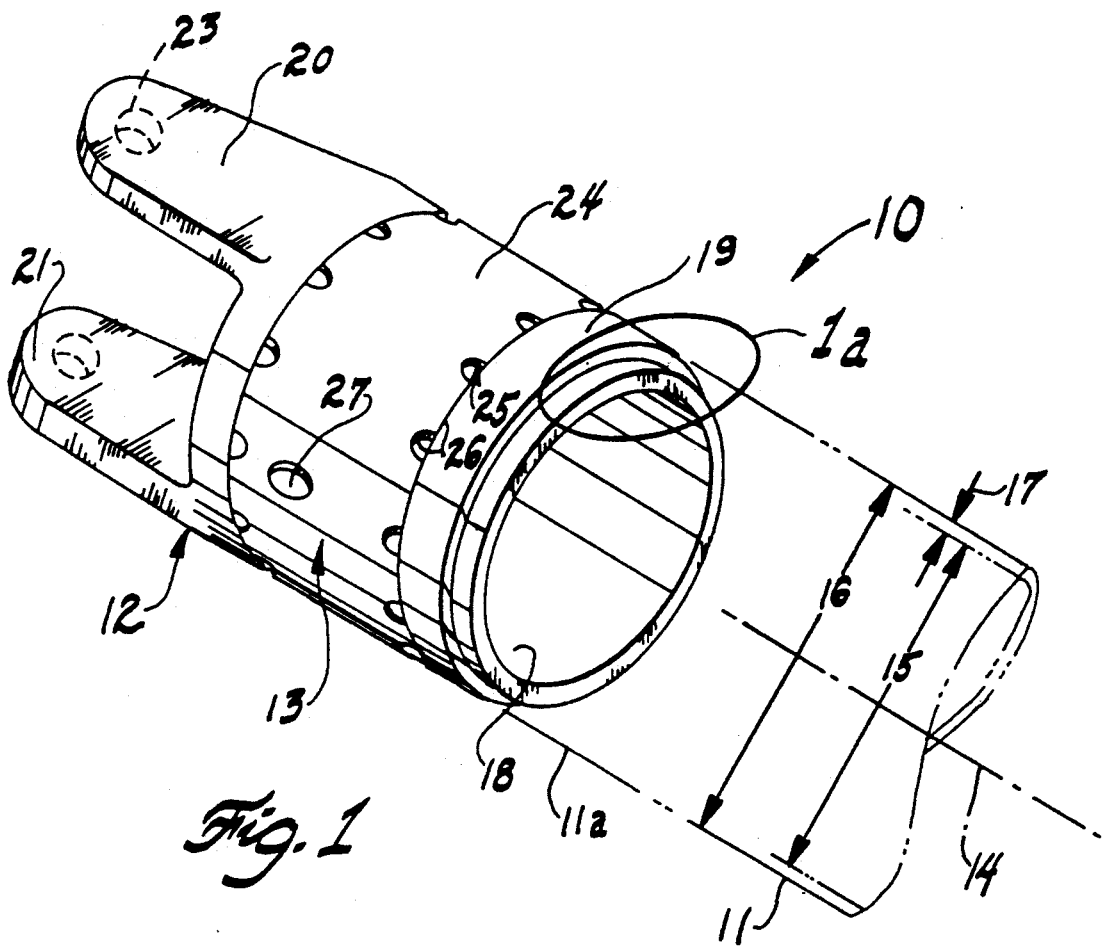
FIG. 1 is a perspective view of a balanced driveline assembly incorporating the features of this invention.
Figure 1A:
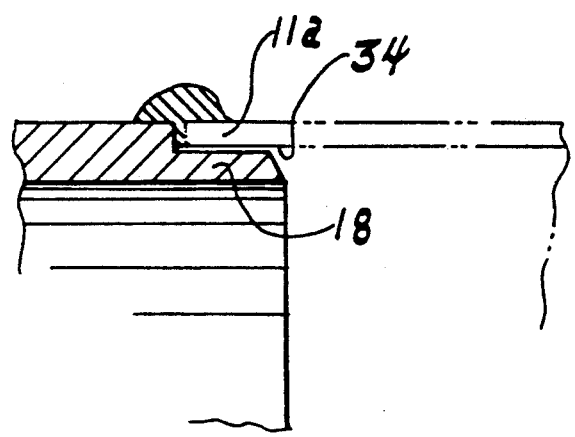
Figure 2:
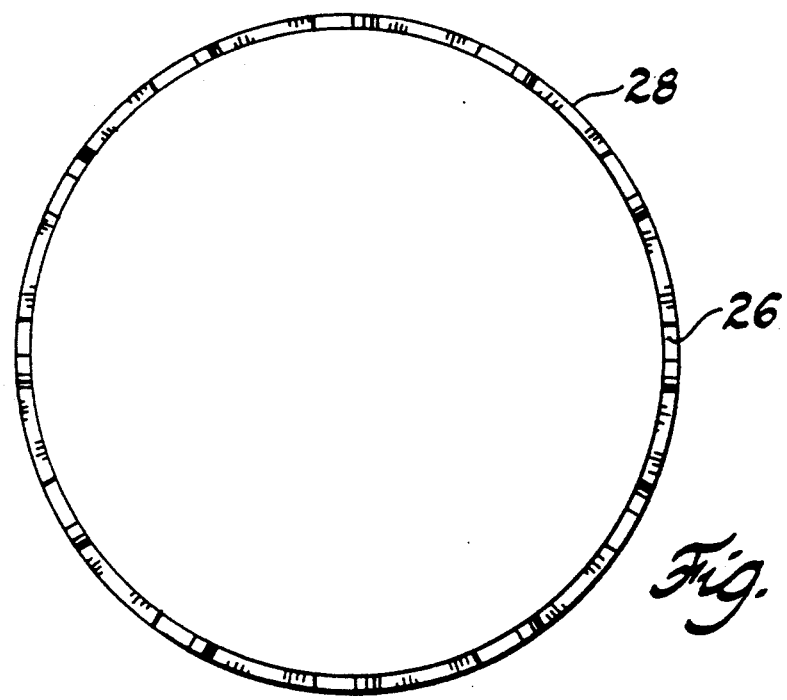
FIGS. 2 and 3, respectively, are top and front elevational views of a steel band embedment used to provide the weldable and lockable surface for weight balancing.
Figure 3:
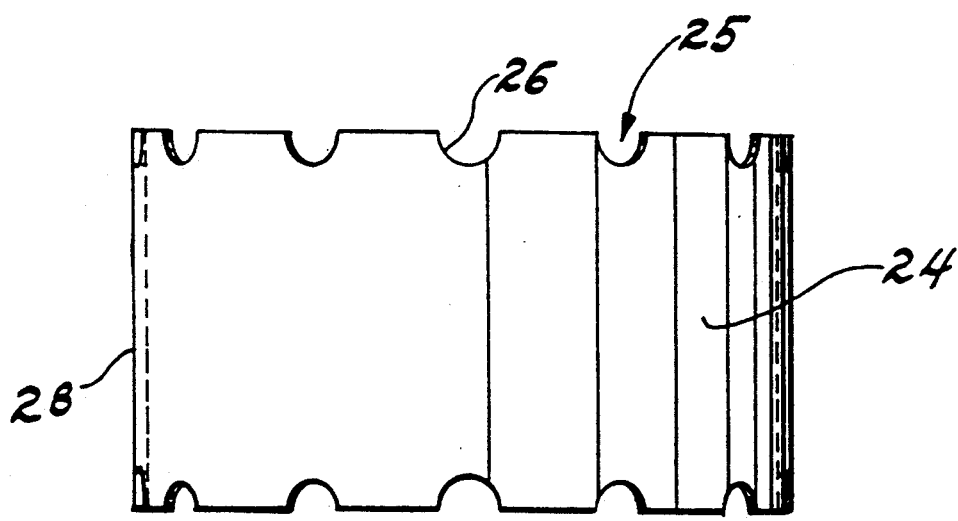

As shown in FIG. 1, the balanced rotary assembly 10 comprises essentially a driveshaft 11, a connector 12 carrying means 13 for balancing the assembly about an axis 14. The driveshaft is comprised of an extruded torque tube having an external diameter 16 of typically between 3.0–4.0 inches, a wall thickness 17 typically in the range of 0.06–0.08 inches, and an internal diameter 15 determined by such external diameter and wall thickness, thus typically between 2.92–3.94 inches. The connector 12 is a cast yoke member having a base 19 which telescopically fits within the end 18 of the torque tube; internal surface 34 of tube end 11a mates with stepped surface of end 18. Suitable weldment annularly joins the end 18 to tube end 11a, as shown in FIG. 1a. A pair of arms 20 and 21 are disposed on opposite sides of the axis 14 and contain openings 23 for receiving a universal joint assembly (not shown). The means 13 for balancing the assembly includes a cylindrical band 24 which is implanted in the outer surface of the cast connector 12 and which incorporates locking means 25. The locking means prevents relative rotational movement between the connector and the band, and specifically is comprised of undulating edges 26, here scallops, at opposite ends of the band which interlock with the cast material of the connector. Balancing means 13 further comprises weldments 27 which are welded to preselected locations about the band to rotationally balance the assembly. The location of such weldments can be selected and carried out by a balancing machine, well known in the art; it may comprise: a machine which rotates the driveshaft assembly at high speed, determines the amount and location of imbalance, and indicates this information on gages for attachment of the balance weight to the driveshaft assembly.

A premise of this invention is the use of a driveline comprised of an aluminum-based material or equivalent lightweight material. It is author's understanding that equivalent functional materials will be either more expensive and less desirable because of their cost, or lack critical straightness when compared to aluminum. "Aluminum-based" is used herein to mean a material that contains at least 50% aluminum-base metal, either in the alloyed or composite condition. The band 24, including its locking means 25, consists of an iron-based material, preferably a low carbon steel. "Iron-based" is used herein to mean a material having at least 50% by volume or weight elemental iron, either in the alloyed or composite condition. Although it is possible that other equivalent metallic welding materials can be used, such as stainless steel or high carbon steel, each have a drawback, the former with respect to high cost and the latter with respect to its difficulty to form.

The band must have a gauge or thickness within a critical range to control the amount of weight that it adds to the assembly as well as to facilitate welding without distortion or burning through during the welding operation. With this in mind, it has been found that the thickness range of 0.06–0.08 inches is desirable. The band 24 must present a full perimeter outer surface 28 which is preferably aligned with the outer surface 27 of the connector base 19. The longitudinal length 28 of such connector base 19 should be controlled to be within a range that is suitable to accommodate the diameter of the largest balance weight to be used.

The locking means 25 (undulating lead and trailing edges 31 and 32) preferably consist of scallops 26 widely spaced apart a distance which can be as much as 180°. The scallops are created by notching each of the edges to a depth of about 0.25–0.65 inches but can be any depth sufficient to render a locking effect. The scallops are easily formed by a piercing operation when separating the band from its stock material, and the particular shape (i.e., semicircle, triangular, square, etc.) of the scallops provides a suitable interlock against relative rotation between the connector and the band when implanted in the body of the connector.

Figure 5:
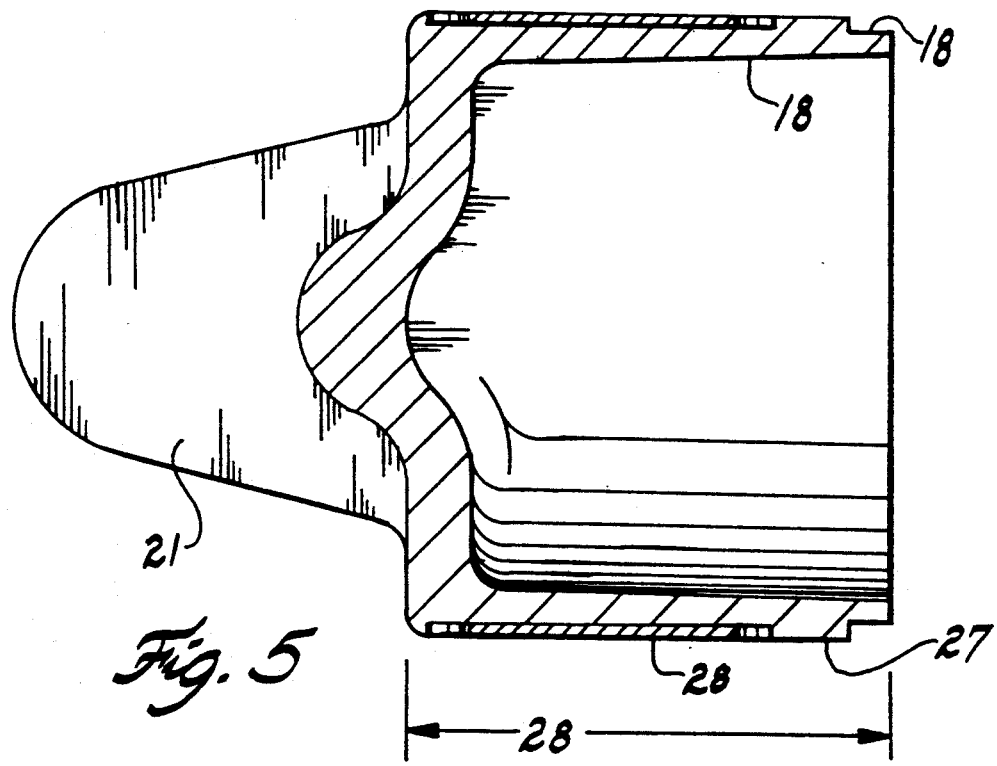
FIG. 5 is a sectional view taken substantially along line 5—5 of FIG. 4.
Figure 4:
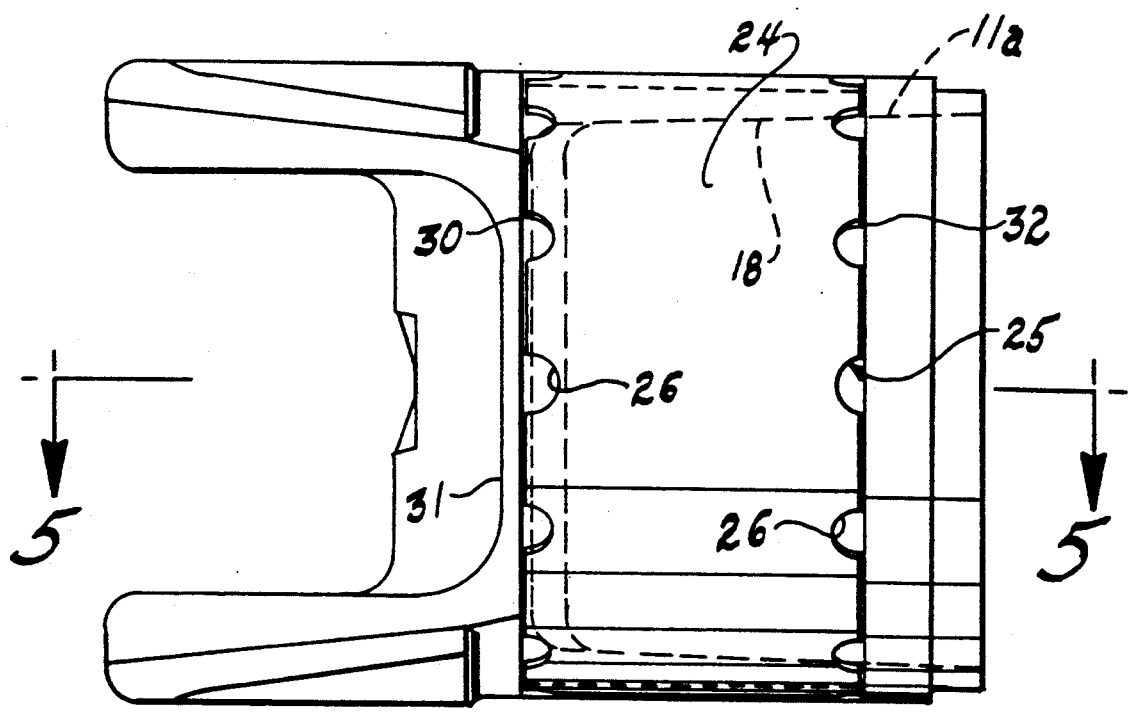
FIGS. 4 is an elevational view of a cast aluminum yoke connector showing the embedment cast-in-place.

As shown in FIGS. 4 and 5, the connector 12 is cast of an aluminum-based material with the iron-based band implanted therein in a manner to expose its peripheral surface thereof. This embedment casting can be carried out by processes such as semipermanent mold, sand casting, diecasting, semisolid metal forming, squeeze casting, etc. It should be noted that the band is placed with its lead edge 30 located substantially adjacent the transverse surface 31 of the connector 12 which extends between the yoke arms 20 and 21. This allows placing of weldments at a position which is at the extreme ends of the driveline. This location permits smaller weldment weights to be employed (such as 0.12–0.90 ounces) and yet achieve balancing within a desired degree. The weldments may be circular planar shapes or be rectangular blocks as along as a desired weight distribution is achieved.

The implanted connector 12 is attached telescopically to the end 11a of an aluminum-based tubular driveshaft with end 18 of the connector received within the interior surface wall 34 of the driveshaft. Such connection between the connector and driveshaft is effected or carried out by TIG welding.

The welding of iron-based weldments 27 to the exposed surface of the iron-based band 24 is carried out by resistance welding.

To illustrate the effectiveness of this invention, the following four driveline assemblies were fabricated and tested under engine dynamometer conditions.

Sample A comprised an extruded 6061 aluminum alloy onto which an iron-based ring was shrunk fit; an aluminum yoke or connector was welded to the torque tube. The ring was comprised of 1018 sheet steel which had to be precision machined, adding great cost. The ring was heated to 400° F. and after cooling promoted an interference fit. The driveline assembly, after adding balancing weldments to the ring, had difficulty retaining good balance over long dynamometer usage because it was not lockable to the torque tube.

Sample B comprised welding aluminum balancing weights to a 333 cast aluminum yoke or connector to which was welded an extruded 6061 aluminum alloy torque tube. The weights had to be extremely large in size due to the low density of aluminum (one-third that of iron), i.e., 2.5" long by 1.0" wide ×25" thick. Dynamometer testing showed that such driveline assembly lacked good balance because such large weights lacked focus. Moreover, the welding of such weights to the connector distorted the critical bearing surfaces of the yoke as a result of TIG welding heat.

Sample C comprised welding small iron weights to a steel band embedded in the collar base of a 333 cast aluminum alloy yoke to which was welded a 6061 extruded aluminum alloy torque tube. The weights were approximately ½ to 1.0" square and 0.18" thick. Each weighed about 0.12–0.67 ounces. Three weldments were equi-circumferentially spaced about the band. Balancing proved to be extremely accurate and stable over long dynamometer testing. This same excellent result was achieved when the cast aluminum alloy for the yoke was varied within the 300 series, such as 356, and the extruded aluminum alloy for the torque tube was varied within the 6000 series.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A balanced rotary assembly having an axis of rotation, comprising:
   (a) an aluminum-based driveshaft;
   (b) at least one cast aluminum-based connector having its weight substantially equally divided on opposite sides of said axis and coaxially secured to said driveshaft;
   (c) a uniformly thick iron-based band embedded in the outer surface of said connector and having means for locking said band against relative rotation with said connector; and
   (d) one or more iron-based members welded to an exposed surface said band to bring said assembly to a desired rotationally balanced condition.

2. The assembly as in claim 1, in which said band is uniformly cylindrical, cast-in-place in said connector, and conforms to the outer surface of the connector.

3. The assembly as in claim 1, in which said band is comprised of low carbon steel.

4. The assembly as in claim 1, in which said driveshaft is comprised of an extruded hollow tube having a uniformly thick wall in the range of 0.06–0.08 inches.

5. The assembly as in claim 1, in which said connector is formed with a tubular base and a yoke extending from said base, said band being embedded in the outer surface of said base with the leading edge thereof adjacent the juncture between said connector base and yoke.

6. The assembly as in claim 1, in which the end of said connector base is stepped to receive the annular wall of said driveshaft.

7. The assembly as in claim 6, in which said undulating edges are created by interrupting the leading and trailing edges with scallops.

8. The assembly as in claim 1, in which said locking means has undulating edges at its leading and trailing edges.

9. The assembly as in claim 1, in which said iron-based members are weldments having predetermined weight and size, and have a circular planar shape.

* * * * *